United States Patent [19]
Robinson

[11] Patent Number: 5,213,688
[45] Date of Patent: May 25, 1993

[54] SHOWER WATER FILTER ASSEMBLY

[76] Inventor: Dennis L. Robinson, 2015 S. Albert St., Allentown, Pa. 18103

[21] Appl. No.: 734,966

[22] Filed: Jul. 24, 1991

[51] Int. Cl.$^5$ ............................................. B01D 35/30
[52] U.S. Cl. ..................................... 210/440; 210/443; 210/459; 239/267; 239/282; 4/605; 4/615
[58] Field of Search .................... 4/605, 615; 239/548, 239/553, 553.3, 266, 267, 268, 282; 210/440, 443, 459

[56] References Cited

U.S. PATENT DOCUMENTS

| | | | |
|---|---|---|---|
| 3,436,024 | 4/1969 | Gregg, Sr. | 239/553.3 |
| 4,828,182 | 5/1989 | Haruch | 239/553.3 |
| 4,933,080 | 6/1990 | Rundzaitis et al. | 210/232 |

*Primary Examiner*—Robert A. Dawson
*Assistant Examiner*—W. L. Millard
*Attorney, Agent, or Firm*—Eckert Seamans Cherin & Mellott

[57] ABSTRACT

A shower water filter assembly includes a housing having a cavity for a filter element which is relatively large relative to the cross section of the water pipe to which the assembly is attached. A water inlet and a water outlet to the housing couple to a shower pipe and a shower nozzle, respectively. The cavity portion of the housing containing the filter element is laterally displaced from the inlet and outlet along the line of the shower pipe. When the filter assembly is operatively connected to the shower pipe, the filter element can be located vertically above the water inlet and the water outlet, and the height of the shower head is not reduced by the interspersed filter assembly.

17 Claims, 2 Drawing Sheets

SHOWER WATER FILTER ASSEMBLY

BACKGROUND OF THE INVENTION

1. Field of the Invention

The invention relates to the field of water filter assemblies, and more particularly, to a water filter assembly for a shower which does not reduce headroom in the shower.

2. Prior Art

Indoor plumbing systems provide water to one or more points of delivery in a building. The water may be supplied from a public water company which serves many users, or from a privately owned well which serves an individual user. All water supplies are at risk of being polluted by contaminants, and most water supplies, whether public or private, contain at least trace amounts of contaminants. The contaminants may be hazardous chemicals or bacteria, or simply suspended particles. The contaminants may result merely in an unpleasant odor or taste in the water, or may produce severe consequences such as sickness, skin rashes, or with long term exposure, cancer.

Public water companies generally test water quality and maintain nominally low levels of contaminants in the water. In order to achieve this, the public water companies generally add chlorine to the water to destroy bacteria. The chlorine itself may provide an unpleasant odor and taste in the water. In an effort to overcome these problems and provide a safer water supply, many users desire water filters in their plumbing systems.

Devices are known for filtering water near a point of delivery in a plumbing system. The filter devices generally include a housing which contains one or more filter media through which delivered water must pass. The housing defines a flow path and has a water inlet, a water outlet, and means for connection to the plumbing system, usually at the ultimate plumbing system outlet such as the end of a faucet. A spray forming nozzle may be connected to the filter outlet in order to provide a desired spray pattern of the water.

The housing typically has a substantially larger cross sectional area than the pipe, faucet or other conduit to which the filter is attached. A large cross section is necessary in order to provide for a larger and longer lasting filter element, and to reduce the extent to which the filter reduces the pressure and flow rate of water passing through. Additionally, the filter element has a substantial depth along the water flow path, such that the water is treated over a span of length sufficient to achieve the desired filtration and/or treatment of the water.

A water filter can be installed on a shower. Shower water filters are especially desirable for eliminating odors from chlorine or the like. Odors are particularly noticeable in shower water because the warm water spray on the user promotes water evaporation, produces droplets, and creates a fine mist which permeates the air and is ingested. Due to the character of a shower, odorous substances enter the air and are sensed at higher levels than is the water from a simple faucet. A shower water filter including, for example, activated charcoal or the like substantially eliminates chlorine odor and other odors by removing the odorous substances from the water before the water is ejected from the shower head. A shower water filter may also add to the water a bactericide or fungicide for preventing the growth of bacteria or fungus in the shower head or shower area between showers. The shower water filter may also filter out organic chemicals which irritate the eyes and skin and may cause cancer following repeated exposure.

While shower water filters provide the foregoing benefits, known devices have a drawback in that they protrude from their connection to the water pipe, which extends outwardly and downwardly form a wall. Inserting a housing large enough for a filter element between the pipe and the shower head results in the shower head being positioned lower in the shower and/or farther from the wall, reducing the available headroom (from the shower floor to the shower head) and shower space generally. The headroom in most showers is not very great in any event, and a reduction in the headroom increases the possibility that users will have to bend or crouch in order to get their head into the spray beneath the shower nozzle. Tall people are particularly subject to this problem because shower pipes are installed at a height which is apt for users of average height. Thus, there is a need for a shower water filter which provides the benefits of filtered shower water without reducing headroom beneath the shower nozzle.

The present invention provides a shower water filter which includes a housing having a water inlet for connection to a shower pipe, and a water outlet for connection to a shower head. A filter element is disposed within the housing. When the filter is operatively connected to the shower pipe, the filter element is located vertically above the water inlet and the water outlet. The present invention provides the benefits of filtered shower water without reducing a height of the shower head above the shower floor.

SUMMARY OF THE INVENTION

It is an object of the invention to provide a shower water filter which is simple to install between a shower pipe and shower head.

It is another object of the invention to provide a shower water filter which reduces odors and contaminants in shower water.

It is a further object of the invention to provide a shower water filter in which a filter element is located vertically above a water inlet and a water outlet such that for the most part the portion of the housing containing the filter is not interposed between the pipe and the shower head.

It is yet another object of the invention to provide a shower water filter which does not substantially reduce shower space, in particular the height of a shower nozzle above a shower floor.

It is still another object of the invention to provide a shower water filter as described, which has a conveniently replaceable filter element.

These and other objects are accomplished by a shower water filter assembly which includes a housing having a water inlet and a water outlet, and means defining a water flow path through a cavity. A filter element is disposed within the cavity such that water flowing through the assembly engages the filter element. The filter element includes at least one filtering medium operable to remove a substance from the water and/or to add a beneficial substance. The water inlet has means for connection to a shower pipe, and the water outlet has means for connection to a shower nozzle, whereby the filter assembly can be interposed between the pipe and nozzle of an existing shower construction. When the filter assembly is operatively connected to the shower pipe, the portion of the housing containing the filter element is laterally displaced from the shower pipe, preferably being located vertically above the water inlet and the water outlet. Water is discharged from the filter assembly at substantially the same height at which it enters the assembly. Thus, available shower space, including the height of the shower nozzle above the shower floor, is not reduced.

The shower water filter assembly according to the invention may include a conveniently replaceable filter element. In this embodiment, the housing includes first and second parts which are detachably connected to define the cavity for the filter element. When the filter element is exhausted or becomes clogged with contaminants, the first and second parts are separated to permit replacement of the used filter element with a new filter element.

BRIEF DESCRIPTION OF THE DRAWINGS

The invention is illustrated and discussed with reference to particular exemplary embodiments as shown in the drawings, wherein.

DETAILED DESCRIPTION OF THE PREFERRED EMBODIMENTS

Figure 1:
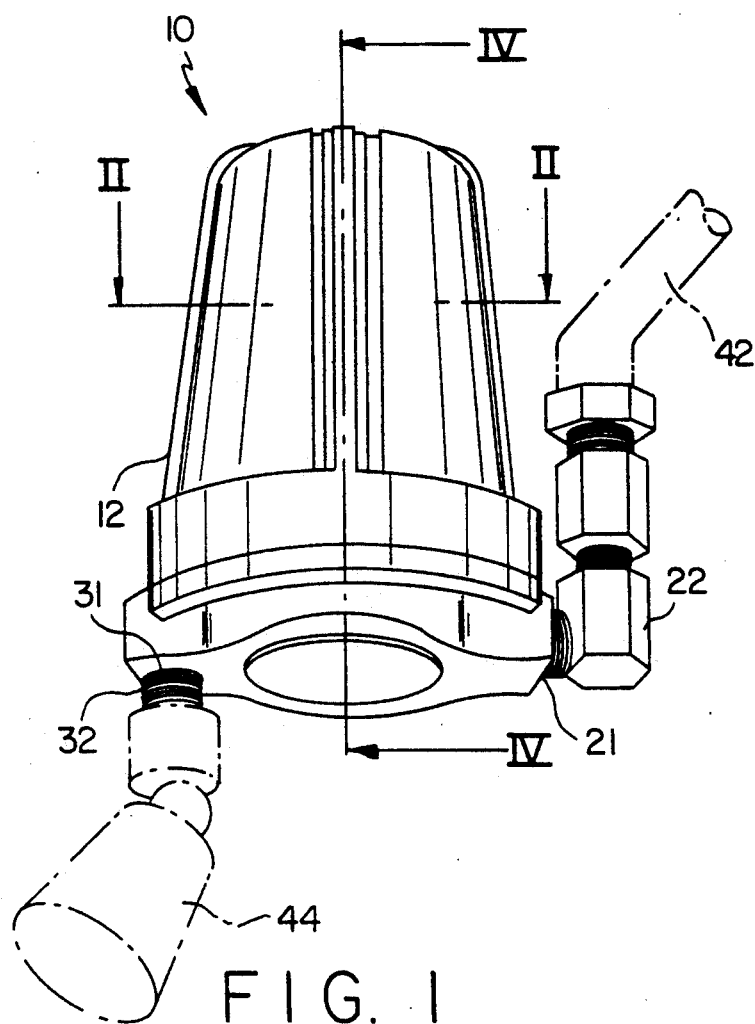
FIG. 1 is a perspective view showing the operatively connected shower water filter according to the invention, the shower pipe and shower head being shown in phantom lines.
Figure 3:
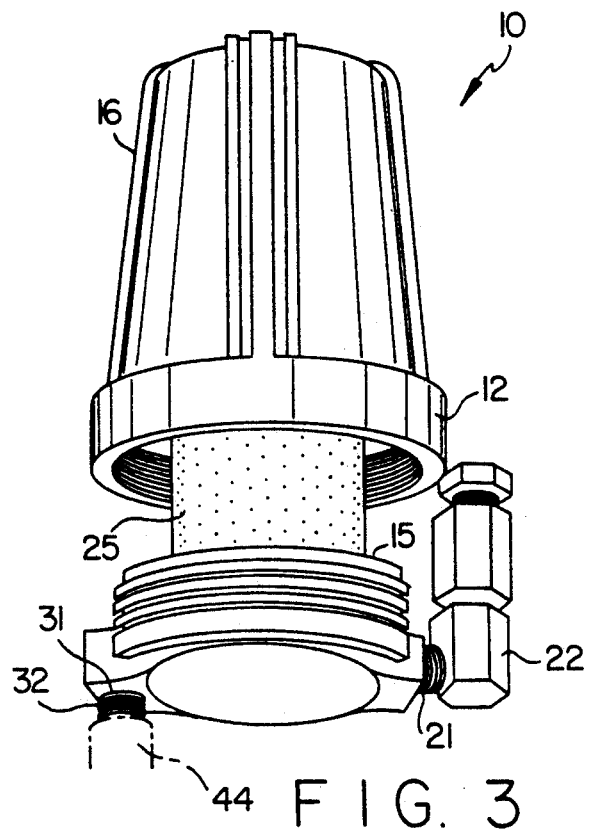
FIG. 3 is a partially exploded perspective view of the shower water filter according to the invention.
Figure 4:
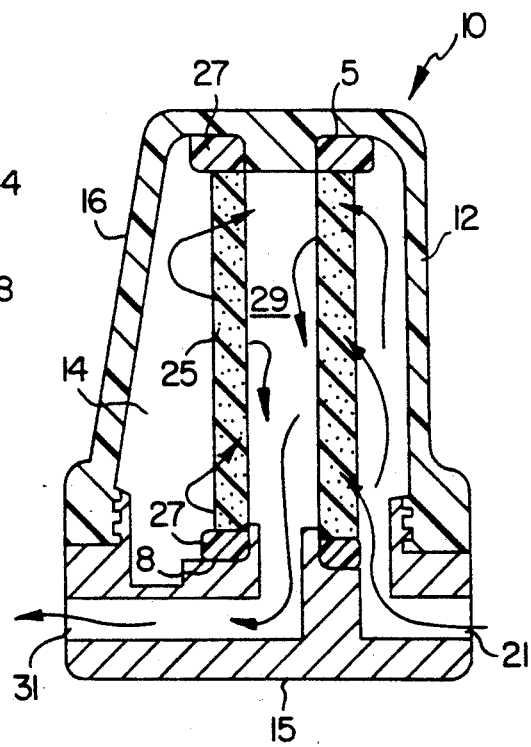
FIG. 4 is a longitudinal section view of the shower water filter according to FIG. 1, along line IV—IV in FIG. 1; and, FIG. 5 is an exploded elevation view showing an alternative embodiment.

A shower water filter according to the invention is shown generally as 10 in FIGS. 1, 3 and 4, and includes a housing 12 having a water inlet 21 and a water outlet 31. The water inlet 21 has means for connecting to a shower pipe 42 (shown in phantom), and the water outlet 31 has means for connecting to a shower nozzle 44 shown in phantom. The inlet 21 and outlet 31 preferably define female threaded passageways which receive threaded couplings 22, 32. The couplings 22, 32 may attach to intermediate fittings, particularly an intermediate fitting defining a male threaded end for the shower nozzle. Alternatively, the inlet 21 and outlet 31 may attach directly to the shower pipe and/or shower nozzle, respectively, using the standard size and pitch of threads.

The housing 12 defines an internal cavity 14 which communicates with the shower pipe and the shower nozzle through the water inlet 21 and the water outlet 31, respectively, forming a flow path for water to pass through the filter assembly from the shower pipe to the shower nozzle. The housing 12 is preferably made of an essentially rigid plastic such as polyvinyl chloride (PVC).

Figure 2:
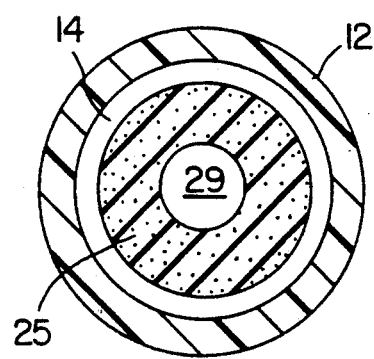
FIG. 2 is a section view taken along line II—II in FIG. 1.

Referring to FIGS. 2-4, a filter element 25 is disposed within the internal cavity 14. The filter element 25 may be a cylindrical cartridge. Sealing means 27 are provided at opposite axial ends of the cartridge to prevent water from bypassing the filter medium. Water entering from the inlet 21 flows along an external face of the filter element and passes through the filter medium to a hollow central portion 29 of the filter element. Water from the hollow central portion flows through the outlet 31 and is discharged at the shower nozzle 44.

The housing 12 is configured so that the portion of the housing defining the cavity for the filter element 25 is displaced laterally from the inlet and outlet such that the inlet and outlet can be placed more closely together than would be possible if the filter element were in line with the inlet and outlet. In the embodiment shown the inlet and outlet are disposed along a line. As shown in FIG. 1, the inlet and outlet can be placed at an angle relative to one another. Alternatively, as shown in FIG. 4, the inlet and outlet can be colinear. Preferably, the portion defining the housing 12 is located vertically above the inlet 21 and the outlet 31 when the filter assembly is operatively connected to the shower pipe 42. The inlet 21 and outlet 31 are then substantially the same height above the shower floor. In the embodiment, the inlet 21 and outlet 31 lie on a horizontal plane at substantially the same height as the outlet of the shower pipe such that the headroom beneath the shower nozzle is not reduced. This linear orientation and relative positioning result in a shower water filter which does not reduce headroom for a user in the shower. The filtering takes place, and the internal filter cavity 14 of the housing is located, at a point laterally displaced from a line defined by the shower pipe. Preferably the filter cavity is placed at a distance above the end of the shower pipe. Water flowing through the filter assembly rises a vertical distance from the inlet, passes through the filter element, and descends to the outlet, which is in line with the inlet and at the same height. The outlet can be located immediately adjacent the inlet to reduce the extent that the filter displaces the shower head outwardly from the wall, or the outlet and inlet can be on opposite sides of the housing. In either case, the shower nozzle 44 is disposed at substantially the same height above the shower floor as it would be without the water filter assembly in place.

The filter element 25 may be replaceable. In this case, the shower water filter assembly comprises a first part and a second part, and means for detachably connecting the first and second parts. The first and second parts may be a base 15 and a canister 16, respectively, which are threadably attached and may include an interspersed seal (not shown). The base and canister can also be attached using a plurality of fasteners, e.g., screws. The base 15 includes the inlet 21 and the outlet 31. An interior surface of the base 15 defines a support surface 8 for the filter element 25. The support surface 8 cooperates with one of the sealing means 27 on the filter element to sealingly contain the filter element when the canister 16 is attached to the base 15 such that water cannot bypass the filter element. The canister 16 is a hollow cup-shaped body defining a sealing surface 5 on an interior end face which cooperates with an other of the sealing means 27 on the filter element to sealingly enclose the filter element when the canister is attached to the base.

Over a period of time, the filter element will become progressively more clogged with contaminants. As the filter element becomes clogged the pressure drop across the filter element increases and water flow out of the shower nozzle is diminished. The filter element must be replaced when the water flow out of the shower nozzle is reduced to a level which is unacceptable to the user.

Figure 5:
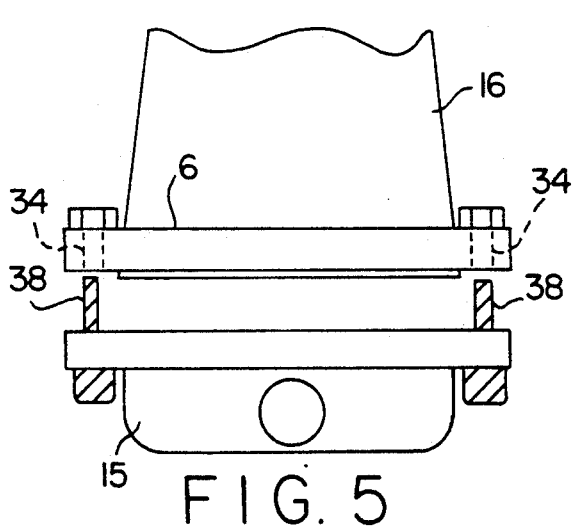

In FIG. 5, the same reference numerals are used as in FIGS. 1-4 to identify corresponding parts. As shown in FIG. 5, the canister may be detachably connected to the base by a plurality of threaded fasteners 38. In this embodiment, the canister includes a flange 6 which defines a plurality of holes 34 for receiving the threaded fasteners therethrough. The base preferably defines a plurality of threaded holes which are engaged by the threaded fasteners, or includes means for holding nuts for engaging the fasteners.

The invention having been disclosed, variations and additional embodiments in accordance with the invention will now become apparent to persons skilled in the art. Reference should be made to the appended claims rather than the foregoing specification to assess the scope of the invention in which exclusive rights are claimed.

I claim:

1. A shower water filter assembly, comprising:
   a housing defining a cavity and having a water inlet and a water outlet communicating with the cavity, the water inlet defining means for connection to a shower pipe, oriented at least partly downwardly toward a floor, and the water outlet defining means for connection to a shower nozzle;
   a filter element disposed in the cavity of the housing;
   wherein the water inlet and water outlet lie substantially on a plane and are aligned in opposite directions and perpendicular to the plane, the water inlet and the water outlet connecting to of the shower pipe and shower nozzle, respectively, at substantially the same said plane, whereby the shower pipe and shower nozzle are minimally spaced from one another in a direction perpendicular to the plane.

2. The shower water filter assembly according to claim 1, wherein the cavity for the filter element is located vertically above the water inlet and the water outlet, whereby a height of the shower nozzle above a floor is not reduced by installing the assembly between said nozzle and the shower pipe.

3. The shower water filter assembly according to claim 1, wherein the filter element is replaceable.

4. The shower water filter assembly according to claim 1, wherein the housing comprises a first part and a second part, and means for detachably connecting the first and second parts.

5. The shower water filter assembly according to claim 4, wherein the means for detachably connecting includes screw threads.

6. The shower water filter assembly according to claim 4, wherein the means for detachably connecting includes threaded fasteners.

7. The shower water filter assembly according to claim 1, wherein at least one of the means for connecting is a threaded coupling.

8. The shower water filter assembly according to claim 1, further comprising sealing means within the cavity operable to seal the filter element relative to the housing.

9. The shower water filter assembly according to claim 1, wherein the inlet and the outlet are substantially colinear and are disposed on an end of the housing.

10. The shower water filter assembly according to claim 9, wherein the inlet and the outlet are threaded, and wherein the means for connection of at least one of the inlet and the outlet includes a fitting threadably received therein.

11. The shower water filter assembly according to claim 1, wherein the water inlet and the water outlet are at an angle relative to one another and are disposed on an end of the housing.

12. A shower water filter assembly, comprising:
    a housing defining a cavity and having a water inlet and a water outlet communicating with the cavity, the water inlet defining means for connection to a shower pipe oriented at least partly downwardly toward a floor, and the water outlet defining means for connection to a shower nozzle;
    a filter element disposed in the cavity of the housing;
    wherein the water inlet and water outlet are oriented oppositely and connect to both the shower pipe and the shower nozzle at substantially equal height, whereby a height of the shower nozzle above the floor is not reduced by installing the assembly between the shower pipe and the shower nozzle.

13. The shower water filter assembly according to claim 12, wherein the housing, water inlet and water outlet are arranged such that the cavity for the filter element is displaced laterally of the shower pipe and shower nozzle.

14. The shower water filter assembly according to claim 13, wherein the cavity for the filter element is located vertically above the water inlet and the water outlet.

15. The shower water filter assembly according to claim 12, wherein the filter element is replaceable.

16. The shower water filter assembly according to claim 12, wherein the housing comprises a first part and a second part, and means for detachably connecting the first and second parts.

17. The shower water filter assembly according to claim 16, wherein one of the first part and the second part defines a substantially flat cap detachably connected to the other of the first part and the second part substantially encompassing the cavity, the flat cap being installable horizontally, the inlet including means adapted to couple with said shower pipe as oriented in a downward direction and the outlet including means adapted to couple with said shower nozzle, as also oriented in a downward direction, and wherein the inlet and the outlet are coupled to the flat cap, whereby the shower water filter assembly occupies a minimal vertical extension between the shower pipe and the shower nozzle.

* * * * *

UNITED STATES PATENT AND TRADEMARK OFFICE
CERTIFICATE OF CORRECTION

PATENT NO. : 5,213,688
DATED : May 25, 1993
INVENTOR(S) : Dennis L. Robinson

It is certified that error appears in the above-indentified patent and that said Letters Patent is hereby corrected as shown below:

In column 5, between lines 27 and 28, insert --wherein the housing, water inlet, and water outlet are arranged such that the cavity for the filter element is displaced laterally of the shower pipe and the shower nozzle; and,--.

In column 5, line 31, delete "of".

Signed and Sealed this

Fourteenth Day of December, 1993

Attest:

BRUCE LEHMAN

Attesting Officer          Commissioner of Patents and Trademarks